Aug. 7, 1928. 1,679,724

G. P. JACKSON ET AL

FURNACE

Filed Sept. 17, 1924 2 Sheets-Sheet 1

INVENTORS
George P. Jackson &
Harlow D. Savage
BY
Synnestvedt & Lechner
ATTORNEYS

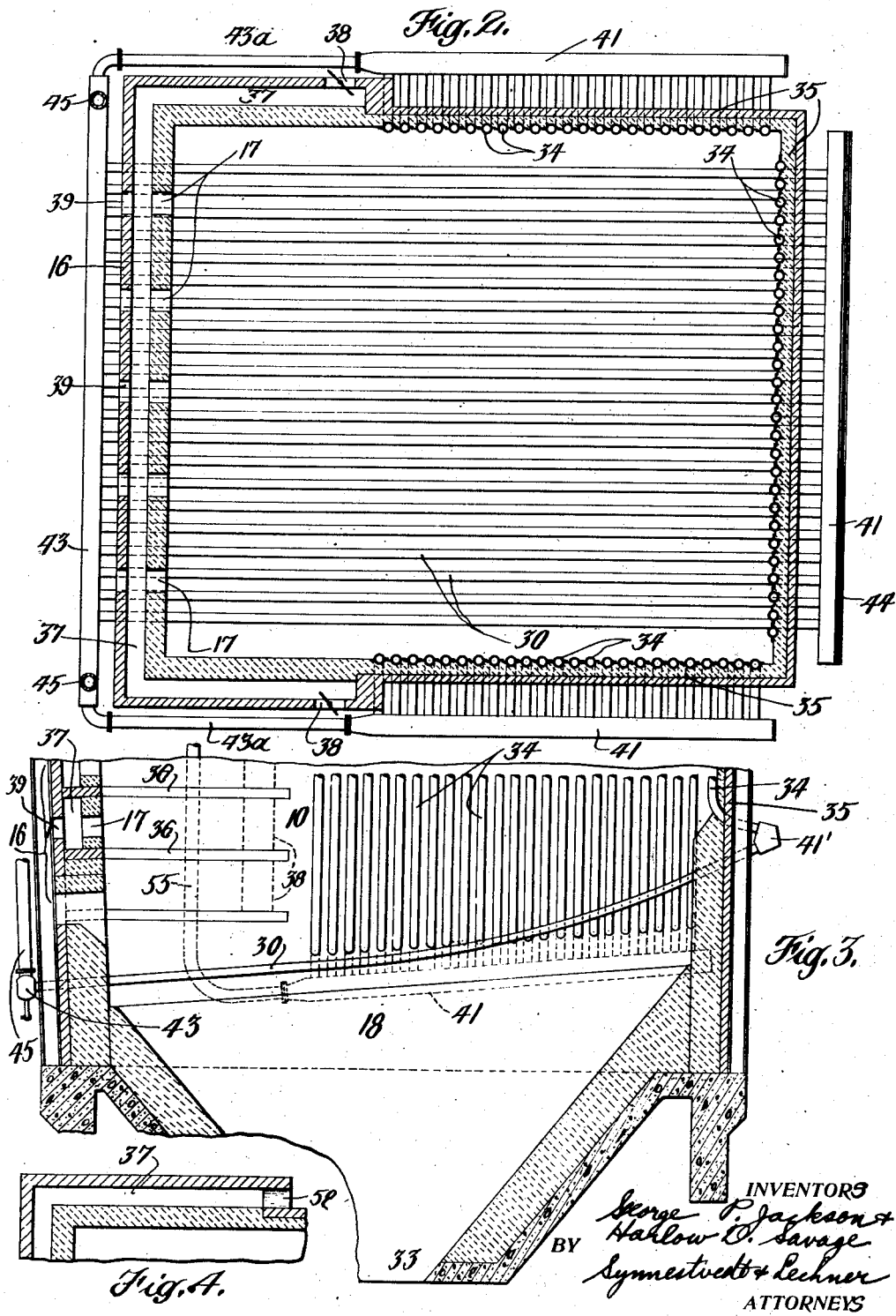

Patented Aug. 7, 1928.

1,679,724

UNITED STATES PATENT OFFICE.

GEORGE P. JACKSON, OF FLUSHING, AND HARLOW D. SAVAGE, OF SCARSDALE, NEW YORK, ASSIGNORS TO COMBUSTION ENGINEERING CORPORATION, OF NEW YORK, N. Y., A CORPORATION OF NEW YORK.

FURNACE.

Application filed September 17, 1924. Serial No. 738,132.

Our invention relates to furnaces adapted for burning fuel in suspension, especially powdered fuel, for the purpose of heating water and generating steam. The invention affords a means of developing and applying the heat to the best advantage, with direct absorption of radiant heat from the burning fuel, but without chilling of the hot gases so as to interfere with ignition and combustion of the fuel. We have hereinafter described and explained our invention with special reference to its use with a water-tube boiler of the Murray type.

In the drawings, Fig. 1 shows a vertical section through a steam boiler furnace embodying our invention.

Fig. 2 shows a horizontal section, taken as indicated by the line 2—2 in Fig. 1.

Fig. 3 is a fragmentary view similar to Fig. 1, but illustrating a somewhat different arrangement or construction.

Fig. 4 shows a fragmentary horizontal section through the furnace wall, illustrating still another difference in construction.

Figure 1:
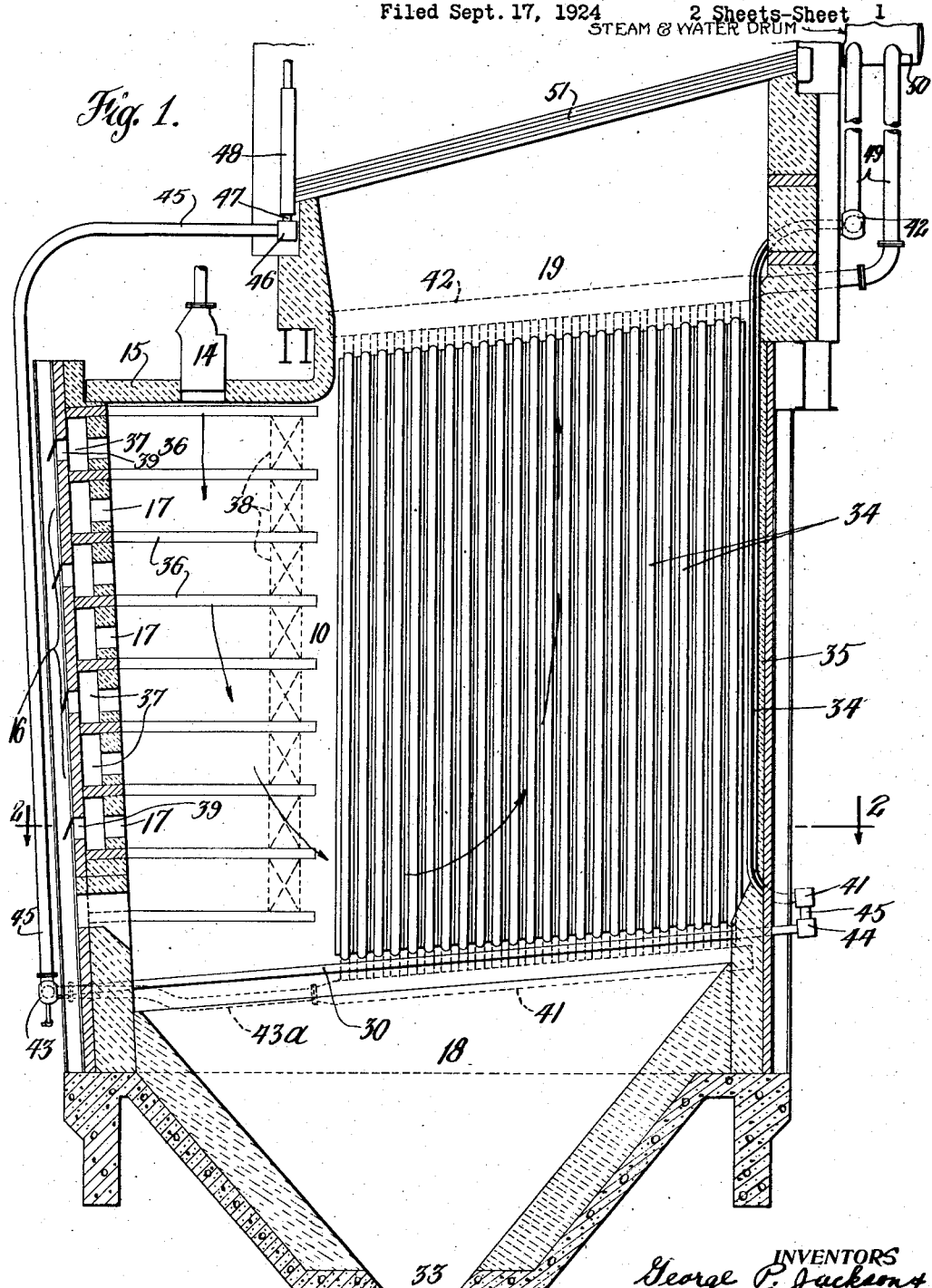

As shown in Fig. 1, the combustion chamber proper at 10 is a large, deep, unobstructed chamber. Powdered fuel preferably with somewhat more than carrying air is fed in through one or more downward directed burners 14 mounted in the roof 15 near the front wall 16, and is continually ignited by the heat of the latter and of the furnace. Air additional to that entering at the burner 14 is (or may be) supplied through inlet openings 17 at various heights in the front wall 16, so as to afford sufficient air to assure combustion, and to form, if desired, a cooling zone in the bottom region 18 of the chamber 10. The burning stream (of mingled air, powdered fuel, combustible gases from the fuel, and products of combustion) descends in the front of the chamber 10 until its momentum is overcome by the upward draft through the boiler. It then bends rearward and ascends, and finally leaves the combustion chamber 10 through an outlet 19 from its upper portion at the rear,—all about as indicated by the arrows. The size of the chamber 10 and the contiguity of the unbaffled downward and upward fuel streams and their change of direction as described assure rapid and complete combustion in the chamber 10; and, as a result, very high temperatures indeed are developed. (Here and hereinafter, I use the terms "front" and "rear" in reference to the regions where the furnace is fired and whence the products of combustion make their exit from its main combustion space or chamber 10, respectively.)

The relatively heavy incombustible residue from the fuel falls or is precipitated toward the floor and toward the sides of the chamber 10, in a finely divided and molten condition. That falling directly to the floor encounters and passes through a cooling zone in its lower region 18, maintained either by an excess of air admitted as already described, or by a "water screen" consisting of a bank of inclined tubes 30 which extend across the combustion chamber 10,—or by both. In the cooling zone at 18 (however it be maintained), the refuse particles are cooled below fusion temperature, so that they collect in the hopper-like furnace bottom as a dust, which can easily be dumped out or otherwise removed at a clean-out opening 33. The water screen 30 also absorbs radiant heat from the deposit in the bottom of the furnace and prevents refusion thereof by such heat from above.

As here shown, the rear portion of the combustion chamber 10—or, at least, of the combustion space proper above the screen 30—is defined by heat absorbent surfaces of steam generating elements 34 consisting of water tubes with longitudinal absorbent fins or flanges at either side. These tubes 34 are arranged with their fins overlapping slightly, so as to form, in effect, a complete heat absorbent metallic wall around three sides of the rear portion of the combustion space,—with the exception of small areas at the rear corners. Outside of them is a refractory, thermo-insulative wall 35. At the sides of the combustion chamber 10, the tubes 34 extend forward to about the front edge of the outlet 19, which approximately coincides with the rear of the descending fuel stream in the front of the combustion chamber. In front of this point, the combustion chamber is defined by heat reverberatory walls of the usual highly refractory and thermo-insulative construction for powdered fuel furnaces.

Thus, it will be seen, the fuel stream is under the influence of the heat radiated and reflected from these highly reverberatory walls at the front and sides of the front portion of the combustion chamber 10 until after ignition has taken place, combustion has become thoroughly established, and ample air has been admitted at the openings 17 (and become sufficiently heated) to assure its completion. Only after this has occurred is the fuel stream exposed, as it bends rearward and ascends, to the absorptive action of the tubes 34 surrounding the rear portion of the chamber 10. These tubes 34 not only absorb the heat by conduction from the outer skin or envelope of the now voluminous fuel stream rising amongst them, but also absorb a large amount of radiant heat from the mass of the flaming stream. At this stage, however, the combustion is so thoroughly established that this loss of heat does not prevent its completion by the time the gases pass into the outlet 19. The cooling effect of the tubes 34 is sufficient to prevent any adhesion of refuse from the fuel to the tubes, or to the narrow areas of refractory walls at the rear corners of the chamber 10; on the contrary, all such particles striking the tubes bounce off and fall through the cooling zone at 30 to the hopper-like furnace bottom.

As here shown, provision is made for preheating the air for combustion in the refractory walled front portion of the combustion chamber 10. For this purpose, this portion of the wall is built double, with extra wide refractory courses 36 extending across the interspace to form horizontal ducts 37. Air admitted through damper controlled openings 38 at the rear ends of these ducts 37, in the side walls, passes forward through them and across the front of the furnace, and is admitted to the combustion chamber through the aforementioned openings 17. If desired, outside air, unheated, may be admitted directly through damper controlled openings 39 in the outer shell of the front wall, in lieu or in supplementation of the heated air. This affords a convenient means of controlling and regulating the temperature of the air for combustion as desired. The passage of air through the ducts 37 not only serves to heat the air, but also to cool this portion of the wall somewhat, though not sufficiently to interfere with ignition and combustion as already described.

As shown in Figs. 1, 2, the tubes 34 at the rear and at the sides of the combustion chamber 10 are bent outward through the refractory wall behind them and connected in the lower and upper headers 41, 42. The screen tubes 30 are connected into the headers 43 at their lower front ends and into headers 44 at their rear upper ends; and these headers 44 are connected at 45 to the superjacent headers 41 belonging to the tubes 34 on the rear furnace wall. The front header 43 is connected at 43ª to the side headers 41, and may be connected by down-flow pipes 45 to a header 46 itself connected at 47 to the down-flow headers 48 of a water tube boiler overlying the combustion chamber outlet 19, while all the headers 42 may be connected by up-flow pipes 49 to the water spaces of the boiler at its up-flow end,—here diagrammatically represented by a fragmentary illustration of a steam and water drum 50. Thus, it will be seen, the water screen 30 and the tubes 34 are all connected in parallel and in harmony with the general boiler circulation. As will readily be understood, only a portion of the water tubes 51 forming the heating surface of the boiler proper are shown.

In the construction shown in Fig. 3, the lower headers 41 for the side tubes 34 have a separate downtake connection 55, and the tubes 30 curve upward at their rear and are connected directly into the header 41' belonging to the rear tubes 34.

As shown in Fig. 4, the horizontal air ducts 37 may, if desired, open rearward at 58, instead of opening laterally through the outer shell of the double wall as in Figs. 1, 2, and 3.

We claim:

A pulverized fuel combustion chamber having a row of substantially upright closely spaced exposed water tubes forming the rear wall, a similar row forming a portion of each side wall, a sheathing for said rows of tubes, exposed refractories forming the front wall and the remaining portion of each side wall, a plurality of substantially horizontal vertically spaced air passages in said refractory front and side walls, inlets to said passages in the side walls adjacent the portion of the chamber formed by the water tubes and outlets from said passages into the chamber in the front wall, means for admitting fuel adjacent the said refractories to be burned in space in the chamber and an outlet from the chamber for the gaseous products of combustion.

In testimony whereof, we have hereunto signed our names.

GEORGE P. JACKSON.
HARLOW D. SAVAGE.